(12) United States Patent
Amidon et al.

(10) Patent No.: US 12,348,391 B2
(45) Date of Patent: Jul. 1, 2025

(54) GENERATING HYBRID NETWORK ACTIVITY RECORDS

(71) Applicant: Arista Networks, Inc., Santa Clara, CA (US)

(72) Inventors: Keith Eric Amidon, Los Altos, CA (US); Jeevan Madhu Kamisetty, San Jose, CA (US); Debabrata Dash, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/665,554

(22) Filed: Feb. 6, 2022

(65) Prior Publication Data

US 2023/0254225 A1   Aug. 10, 2023

(51) Int. Cl.
*G06F 15/173* (2006.01)
*H04L 43/026* (2022.01)
*H04L 43/028* (2022.01)

(52) U.S. Cl.
CPC .......... *H04L 43/026* (2013.01); *H04L 43/028* (2013.01)

(58) Field of Classification Search
CPC .............................. H04L 43/026; H04L 43/028
USPC ......................................................... 709/224
See application file for complete search history.

(56) References Cited

U.S. PATENT DOCUMENTS

| 8,005,012 | B1 * | 8/2011 | Aybay | H04L 43/02 370/252 |
| 8,577,817 | B1 * | 11/2013 | Keralapura | G06N 20/00 370/235 |
| 10,673,880 | B1 * | 6/2020 | Pratt | H04L 63/1425 |
| 11,196,710 | B1 * | 12/2021 | Zaino | H04L 63/1425 |
| 11,223,689 | B1 * | 1/2022 | Amdahl | H04L 69/14 |
| 11,438,344 | B1 * | 9/2022 | Bajwa | H04L 63/1408 |
| 2001/0055274 | A1 * | 12/2001 | Hegge | H04L 47/2441 370/423 |
| 2007/0044147 | A1 * | 2/2007 | Choi | H04L 43/00 726/12 |
| 2007/0050475 | A1 * | 3/2007 | Hughes | H04L 12/66 709/218 |
| 2011/0206064 | A1 * | 8/2011 | Head | H04L 69/12 370/474 |
| 2012/0233311 | A1 * | 9/2012 | Parker | H04L 43/022 709/224 |
| 2012/0324123 | A1 * | 12/2012 | Fox | H04N 21/222 709/231 |
| 2013/0042323 | A1 * | 2/2013 | Narayanaswamy | H04L 63/1408 709/224 |
| 2013/0250761 | A1 * | 9/2013 | Shatzkamer | H04W 28/0226 370/235 |
| 2013/0298254 | A1 * | 11/2013 | Thomas Hall | H04L 63/20 726/26 |

(Continued)

*Primary Examiner* — Thuong Nguyen
(74) *Attorney, Agent, or Firm* — Fountainhead Law Group, PC

(57) ABSTRACT

Embodiments of the present disclosure include techniques for generating hybrid network activity records. A stream of packet data is received. A flow in the stream of packet data is identified. Deep packet inspection operations are performed on a first subset of packets in the flow to extract a first set of data. Flow stat operations are performed on a second subset of packets in the flow to extract a second set of data. Based on the first and second sets of data, a set of network activity records are generated.

20 Claims, 9 Drawing Sheets

(56) References Cited

U.S. PATENT DOCUMENTS

| | | | |
|---|---|---|---|
| 2014/0139687 A1* | 5/2014 | Adams | H04L 43/0894 348/192 |
| 2014/0198789 A1* | 7/2014 | Kim | H04L 69/04 370/392 |
| 2015/0244678 A1* | 8/2015 | Stevens, IV | H04L 45/70 726/25 |
| 2016/0094418 A1* | 3/2016 | Raney | H04L 43/20 370/241 |
| 2017/0099310 A1* | 4/2017 | Di Pietro | H04L 63/1425 |
| 2017/0126516 A1* | 5/2017 | Tiagi | H04L 43/08 |
| 2017/0195462 A1* | 7/2017 | Kfir | H04L 63/1416 |
| 2017/0237642 A1* | 8/2017 | Goel | H04L 43/0888 370/252 |
| 2017/0366374 A1* | 12/2017 | Osuga | H04L 47/31 |
| 2018/0145897 A1* | 5/2018 | Nuthalapati | H04L 43/12 |
| 2018/0198715 A1* | 7/2018 | Shmilovici | H04L 47/2483 |
| 2018/0219879 A1* | 8/2018 | Pierce | H04L 41/142 |
| 2018/0219888 A1* | 8/2018 | Apostolopoulos | G06F 21/554 |
| 2018/0302302 A1* | 10/2018 | Doggett | H04L 67/535 |
| 2019/0124010 A1* | 4/2019 | Murgia | H04L 67/61 |
| 2019/0245894 A1* | 8/2019 | Epple | H04L 63/1483 |
| 2019/0312904 A1* | 10/2019 | Stevens, IV | H04L 63/1433 |
| 2020/0275358 A1* | 8/2020 | Bordeleau | H04L 41/5054 |
| 2020/0366611 A1* | 11/2020 | Kommula | H04L 45/125 |
| 2021/0184966 A1* | 6/2021 | Ramaswamy | H04L 45/74 |
| 2021/0409428 A1* | 12/2021 | Patel | G06F 21/552 |
| 2022/0086178 A1* | 3/2022 | Jayamohan | G06F 9/45558 |
| 2022/0407794 A1* | 12/2022 | Osawa | H04L 43/0894 |
| 2023/0188443 A1* | 6/2023 | Shah | H04L 43/0829 370/241 |

* cited by examiner

GENERATING HYBRID NETWORK ACTIVITY RECORDS

BACKGROUND

There are many ways to monitor network activity in networks. One approach is deep packet inspection (DPI) analysis. In general, DPI analysis provides detailed information about flows of traffic being forwarded through the network. This allows for more effective threat detection techniques to be applied to the data. However, the DPI analysis approach comes at the expense of computing resources (e.g., processing, memory, etc.) as well as storage. Another network monitoring approach is flow statistics (also referred to as flow stats) analysis. Flow stats analysis techniques typically require less computing resources and storage. However, flow stats data is limited in what information can be learned from the data for security detection purposes.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for generating hybrid network activity records. In some embodiments, a system includes a set of connected network devices and a set of security tools (e.g., security detection tools, security analytics tools, etc.). A particular network device may receive packets from other network devices and forward the packets appropriately (e.g., transmit packets to network devices so the packets can reach their intended destination, drop packets, etc.). When the particular network device detects a new flow of traffic (also referred to simply as a flow), the particular network device can perform DPI operations on packets at the beginning of the flow to extract data from these packets and generate DPI records based on the extracted data. The particular network device may also perform flow stats operations on packets in the flow to collect flow stats data and generate flow records from the flow stats data. The particular network device can then generate hybrid network activity records by combining the DPI records associated with the flow with the flow records associated with the flow. Finally, the particular network device may send the hybrid network activity records to one or more of the security tools for further processing.

Figure 1:
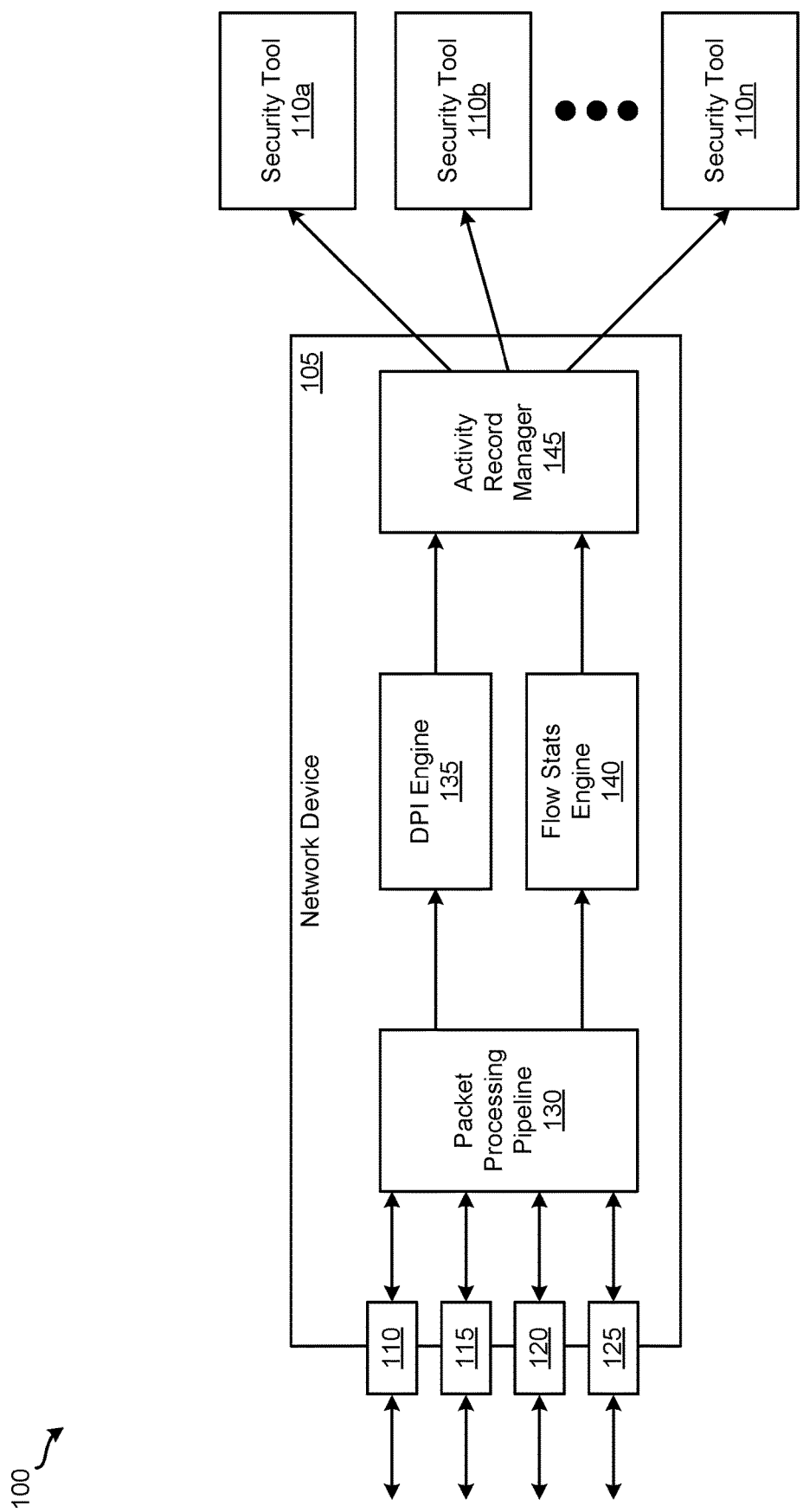
FIG. 1 illustrates a system according to some embodiments.

FIG. 1 illustrates a system 100 according to some embodiments. As shown, system includes network device 105 and security tools 110a-n. Each of the network security tools 110a-n can be a network device, a computing device, a security platform system, etc. Examples of security tools include a security detection tool, a security analytics tool, a firewall tool, an intrusion detection tool, etc., and any combination thereof.

As illustrated in FIG. 1, network device 105 includes network ports 110-125, packet processing pipeline 130, DPI engine 135, flow stats engine 140, and activity record manager 145. Each of the network ports 110-125 is communicatively coupled to one or more network devices (not shown). In addition, each of the network ports 110-125 is configured to receive packets from other network devices (e.g., ingress packets) as well as transmit packets out of network device 105 (e.g., egress packets) to other network devices. For example, when any of the network ports 110-125 receives an ingress packet from another network device, the network port sends the ingress packet to packet processing pipeline 130 for processing. Similarly, when any of the network ports 110-125 receives a packet from packet processing pipeline 130 for egress, the network port transmits the egress packet out of network device 105 via the network port.

Packet processing pipeline 130 is responsible for processing packets that network device 105 receives (e.g., via network ports 110-125) and determining how to forward packets. For instance, packet processing pipeline 130 may use a forwarding information base (FIB) (also referred to as a forwarding table or a media access control (MAC) table) to determine how to forward packets. Additionally, when packet processing pipeline 130 determines that a particular packet is to egress out of network device 105, packet processing pipeline 130 determines an egress port (e.g., via network ports 110-125) and sends the particular packet to the determined egress port for transmission out of network device 105. While FIG. 1 shows one packet processing pipeline handling the packet processing for one set of network ports, one of ordinary skill in the art will appreciate that network device 105 may include any number of packet processing pipelines that each handle packet processing for a set of network ports.

Packet processing pipeline 130 can send data associated with the packets it forwards to DPI engine 135 and flow stats engine 140. For example, packet processing pipeline 130 may send DPI engine 135 copies of packets it is processing. In some embodiments, for packets in a flow that packet processing pipeline 130 is processing, it may send copies of a defined number of packets in the flow (e.g., copies of a defined number of packets at the beginning of the flow, copies of a defined number of randomly selected packets in the flow, copies of a defined number of packets at the beginning and the end of the flow, etc.) to DPI engine 135. As another example, packet processing pipeline 130 can send copies of packets that it is processing to flow stats engine 140. In some embodiments, for a given flow, packet processing pipeline 130 sends flow stats engine 140 a subset of the packets in the flow.

DPI engine 135 is configured to perform DPI operations on packets. For instance, when DPI engine 135 receives a packet from packet processing pipeline 130, DPI engine 135 performs a set of DPI operations on the packet to extract values of attributes in the packet. In some embodiments, DPI engine 135 performs DPI operations on a packet if the packet belongs to an application protocol in a set of defined application protocols. Examples of application protocols include a domain name system (DNS) protocol, a hypertext transfer protocol (HTTP), a transport layer security (TLS) protocol, a server message block (SMB) protocol, and a lightweight directory access protocol (LDAP), among the many standardized protocols used commonly in networks. For a packet belonging to a particular application protocol in the set of defined application protocols, DPI engine 135 parses through the application protocol messages included in the particular packet and extracts values of defined attributes in the protocol messages. Next, DPI engine 135 generates a DPI record that includes the extracted attribute values and sends the DPI record to activity record manager 145.

Flow stats engine 140 performs flow stats operations on packets. For example, flow stats engine 140 may receive packets from packet processing pipeline 130. For a given packet, flow stats engine 140 performs a set of flow stats operations on the packet to extract flow stats data from the packet and sends them to activity record manager 145. Examples of flow stats data include the source Internet Protocol (IP) address of a packet, the destination IP address of the packet, the source port of the packet, the destination port of the packet, the transport protocol used for the packet, the size of the packet (e.g., a number of bytes), etc. Thus, unlike the DPI engine 135, flow stats engine 140 does not look at the application protocol messages of a packet. Rather, flow stats engine 140 extracts information included in the header of the packet. In other words, flow stats engine 140 looks at information in the transport layer of the packet whereas the DPI engine 135 looks further at information in the application layer of the packet.

Activity record manager 145 is configured to manage activity records based on DPI engine data and flow stats data. For instance, activity record manager 145 can receive DPI data from DPI engine 135 and flow stats data from flow stats engine 140. In some embodiments, each set of flow stats data that activity records manager 145 receives from flow stats engine is associated with a unidirectional flow of traffic. For example, when a source and a destination have bidirectional communication, activity record manager 145 would receive flow stats associated with a first flow from the source to the destination and flow stats associated with a second flow from the destination to the source. In some embodiments, activity record manager 145 may generate bidirectional flow records based on flow stats associated with unidirectional flows. For instance, activity record manager 145 may use a hash function (e.g., a symmetric hash function) to calculate a hash value on the source IP address, destination IP address, source port, destination port, and transport protocol attribute values in each set of flow stats data that activity record manager 145. If the hash value of a set of flow stats data does not match the hash value associated with an existing flow, activity record manager 145 creates a new flow record and stores the set of flow stats in the new flow record. If the hash value of a set of flow stats matches the hash value associated with an existing flow record, activity record manager 145 updates the existing flow record with the set of flow stats data. In this manner, a particular flow record captures flow stats data in both directions because the source IP address, destination IP address, source port, destination port, and transport protocol attribute values are the same for flow stats data in both directions resulting in the same hash value.

Additionally, activity record manager 145 generates activity records based on the bidirectional flow records and DPI data received from DPI engine 135. For instance, in some cases, activity record manager 145 generates an activity record for each message in an application protocol. In some embodiments, the DPI data that activity record manager 145 receives from DPI engine 135 indicates the start and end of a decoded message. Next, activity record manager 145 determines flow stats data associated with the message by using the hash function to calculate a hash value on the source IP address, destination IP address, source port, destination port, and transport protocol attribute values extracted from the packet during the DPI operations and finding flow records that have matching hash values. Then, activity record manager 145 generates an activity record that includes a subset of the attribute values in the decoded message and flow stats data from the associated flow records. In other cases, activity record manager 145 can generate an activity record based on multiple messages in an application protocol. For example, activity record manager 145 may create a single activity record for a request and response pair of messages in the DPI data. To do so, activity record manager 145 performs the same operations described above for the single message case except activity record manager 145 includes both a subset of attribute values from the request message and a subset of attribute values from the response message into the activity record along with the associated flow stats data.

Activity record manager 145 is also configured to manage the termination of flows. For example, when activity record manager 145 receives DPI data from DPI engine 135 or flow stats data from flow stats engine 140, it determines whether the flow is already being tracked (e.g., by using the hashing technique described above). If not, activity record manager generates a new flow record and updates the flow record with the DPI data or flow stats data. In addition, activity record manager 145 starts a termination inactivity timer value (e.g., a date and time value) that is set to a defined amount of time (e.g., thirty seconds, a minute, five minutes, etc.) in the future. If the flow is already being tracked (e.g., a flow record exists for the flow), activity record manager 145 updates the flow record associated with the flow with the DPI data or flow stats data and resets the termination inactivity timer value to the defined amount of time in the future again. If the DPI data or flow stats data indicates that a flow has been terminated, activity record manager 145 updates the flow record associated with the flow with the DPI data or flow stats data, records the type of update indicating the termination, and resets the termination inactivity timer value to the defined amount of time in the future again. When the termination inactivity timer value of a flow record is reached (i.e., no updates were received by the timer value), activity record manager 145 determines that the flow has completed, generates an activity record based on the data included in the flow record, and deletes the flow record.

Figure 2A:
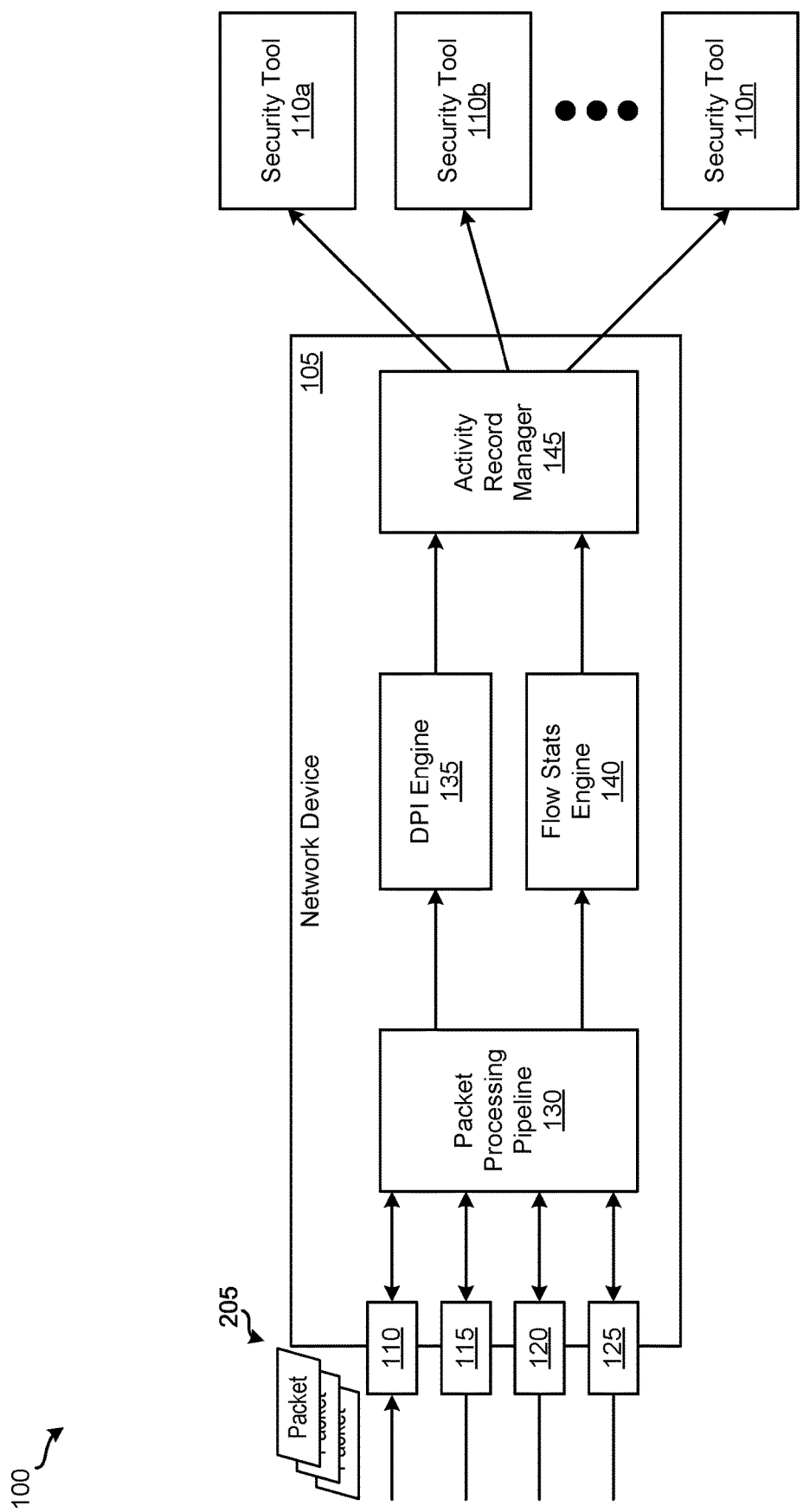
FIGS. 2A-2F illustrate an example data flow through the system illustrated in FIG. 1 according to some embodiments.

FIGS. 2A-2F illustrate an example data flow through system 100 according to some embodiments. Specifically, FIGS. 2A-2F illustrate the packet flow during a server block message (SMB) protocol authentication failure. As depicted in FIG. 2A, the example data flow begins by network device 105 receiving packets 205 at network port 110. The following Table illustrates examples of packets in packets 205:

TABLE 1

| No. | Time | Source | Destination | Protocol | Length | Info |
|---|---|---|---|---|---|---|
| 1 | 0 | 192.168.198.203 | 192.168.198.204 | TCP | 66 | 49847 > 139 [SYN] Seq = 0 Win = 8192 Len = 0 MSS = 1460 WS = 256 SACK_PERM = 1 |
| 2 | 0.000242 | 192.168.198.204 | 192.168.198.203 | TCP | 66 | 139 > 49847 [SYN, ACK] Seq = 0 Ack = 1 Win = 8192 Len = 0 MSS = 1460 WS = 256 SACK_PERM = 1 |
| 3 | 0.000255 | 192.168.198.203 | 192.168.198.204 | NBSS | 126 | Session request, to DESKTOP-AFPVEQ2<20> from IE11WIN7<00> |
| 4 | 0.000516 | 192.168.198.204 | 192.168.198.203 | NBSS | | Positive session response |
| 5 | 0.000946 | 192.168.198.203 | 192.168.198.204 | SMB | 213 | Negotiate Protocol Request |
| 6 | 0.003378 | 192.168.198.204 | 192.168.198.203 | TCP | 60 | 139 > 49847 [ACK] Seq = 5 Ack = 232 Win = 65536 Len = 0 |
| 7 | 0.004922 | 192.168.198.204 | 192.168.198.203 | SMB2 | 506 | Negotiate Protocol Response |
| 8 | 0.005045 | 192.168.198.203 | 192.168.198.204 | SMB2 | 162 | Negotiate Protocol Request |
| 9 | 0.007269 | 192.168.198.204 | 192.168.198.203 | SMB2 | 506 | Negotiate Protocol Response |
| 10 | 0.007794 | 192.168.198.203 | 192.168.198.204 | SMB2 | 220 | Session Setup Request, NTLMSSP_NEGOTIATE |
| 11 | 0.008089 | 192.168.198.204 | 192.168.198.203 | SMB2 | 401 | Session Setup Response, Error: STATUS_MORE_PROCESSING_REQUIRED, NTLMSSP_CHALLENGE |
| 12 | 0.008324 | 192.168.198.203 | 192.168.198.204 | SMB2 | 302 | Session Setup Request, NTLMSSP_AUTH, User: \\ |
| 13 | 0.008882 | 192.168.198.204 | 192.168.198.203 | SMB2 | 131 | Session Setup Response, Error: STATUS_ACCESS_DENIED |
| 14 | 0.00903 | 192.168.198.203 | 192.168.198.204 | TCP | 60 | 49847 > 139 [FIN, ACK] Seq = 754 Ack = 1333 Win = 64256 Len = 0 |
| 15 | 0.009131 | 192.168.198.204 | 192.168.198.203 | TCP | 60 | 139 > 49847 [FIN, ACK] Seq = 1333 Ack = 755 Win = 64768 Len = 0 |
| 16 | 0.00943 | 192.168.198.203 | 192.168.198.204 | TCP | 60 | 49847 > 139 [ACK] Seq = 755 Ack = 1334 Win = 64256 Len = 0 |

As shown in Table 1, packets 205 includes sixteen packets: eight packets in one direction and eight packets in the opposite direction (e.g., eight packets from 192.168.198.203 to 192.168.198.204 and eight packets from 192.168.198.204 to 192.168.198.203) in this example. When packet processing pipeline 130 receives each of the packets 205, packet processing pipeline 130 processes the packet and forwards it accordingly so the packet can reach its destination.

Figure 2B:
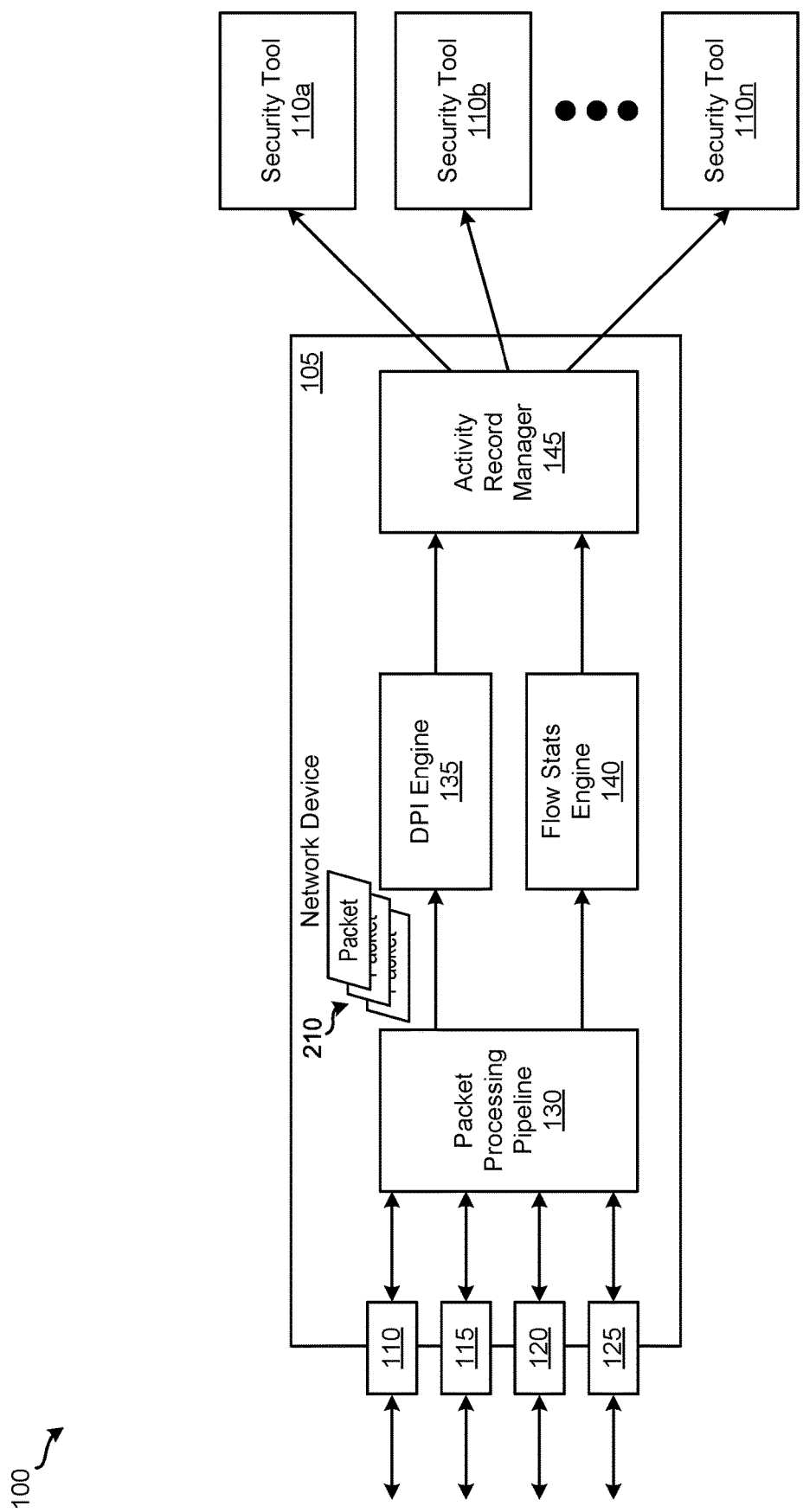

For this example, packets 205 are packets at the beginning of a flow for the SMB protocol. As such, packet processing pipeline 130 sends copies of packets 205 to DPI engine 135 and copies of packets 205 to flow stats engine 140. FIG. 2B illustrates packet processing pipeline 130 sending packets 210 to DPI engine 135. Here, packets 210 are copies of packets 205. For each of the packets 210, DPI engine 135 performs a set of DPI operations on the packet by parsing through the SMB application protocol messages included in the packet, extracting values of defined attributes in the protocol messages, generating a DPI record that includes the extracted attribute values. The following Table 2 illustrates DPI records generated based on packets 210:

TABLE 2

| DPI Data Field | Value | Usage |
|---|---|---|
| smb:request | Start | Determine PDU boundary |
| smb:version | 1 | Include in activity |
| smb:query_type | 1 (Request) | Determine request or response |
| smb:command | 114 (Negotiate Protocol) | Determine activity type |
| smb:dialect | PC NETWORK PROGRAM 1.0 | Include in activity |
| smb:dialect | LANMAN1.0 | Include in activity |
| smb:dialect | Windows for Workgroups 3.1a | Include in activity |
| smb:dialect | LM1.2X002 | Include in activity |
| smb:dialect | LANMAN2.1 | Include in activity |
| smb:dialect | NT LM 0.12 | Include in activity |
| smb:dialect | SMB 2.002 | Include in activity |
| smb:dialect | SMB 2.??? | Include in activity |
| smb:request | End | Determine PDU boundary |
| smb:request | Start | Determine PDU boundary |
| smb:version | 2 | Include in activity |
| smb:query_type | 2 (Response) | Determine request or response |
| smb:command | 0 (Negotiate Protocol) | Determine activity type |
| smb:dialect_name | 767 (0x02ff - SMB2 wildcard) | Include in activity |
| smb:request | End | Determine PDU boundary |
| smb:request | Start | Determine PDU boundary |
| smb:version | 2 | Include in activity |
| smb:query_type | 1 (Request) | Determine request or response |
| smb:command | 0 (Negotiate Protocol) | Determine activity type |
| smb:dialect_name | 514 (0x0202 - SMB 2.0.2) | Include in activity |
| smb:dialect_name | 528 (0x0210 - SMB 2.1) | Include in activity |
| smb:request | End | Determine PDU boundary |
| smb:request | Start | Determine PDU boundary |
| smb:version | 2 | Include in activity |
| smb:query_type | 2 (Response) | Determine request or response |
| smb:command | 0 (Negotiate Protocol) | Determine activity type |
| smb:dialect_name | 528 (0x0210 - SMB 2.1) | Include in activity |
| smb:request | End | Determine PDU boundary |
| smb:request | Start | Determine PDU boundary |

TABLE 2-continued

| DPI Data Field | Value | Usage |
|---|---|---|
| smb:version | 2 | Include in activity |
| smb:query_type | 1 (Request) | Determine request or response |
| smb:command | 1 (Session Setup) | Determine activity type |
| smb:ntlm_identifier | NTLMSSP | Determine Authentication Type |
| smb:ntlm_message_type | 1 (NTLMSSP_NEGOTIATE) | Determine activity type |
| smb:request | End | Determine PDU boundary |
| smb:request | Start | Determine PDU boundary |
| smb:version | 2 | Include in activity |
| smb:query_type | 2 (Response) | Determine request or response |
| smb:command | 1 (Session Setup) | Determine activity type |
| smb:ntlm_identifier | NTLMSSP | Determine Authentication Type |
| smb:ntlm_message_type | 2 (NTLMSSP_CHALLENGE) | Determine activity type |
| smb:ntlm_chg_tg_info | Start | We use this attribute to fix a bug. |
| smb:ntlm_chg_tg_info_dns_comp | DESKTOP-AFPVEQ2 | Include in activity |
| smb:target_info_type | 2 | Include in activity |
| smb:target_info_value | DESKTOP-AFPVEQ2 | Include in activity |
| smb:ntlm_chg_tg_info_dns_dn | DESKTOP-AFPVEQ2 | Include in activity |
| smb:target_info_type | 1 | Include in activity |
| smb:target_info_value | DESKTOP-AFPVEQ2 | Include in activity |
| smb:ntlm_chg_tg_info_nb_comp | DESKTOP-AFPVEQ2 | Include in activity |
| smb:target_info_type | 4 | Include in activity |
| smb:target_info_value | DESKTOP-AFPVEQ2 | Include in activity |
| smb:ntlm_chg_tg_info_nb_dn | DESKTOP-AFPVEQ2 | Include in activity |
| smb:target_info_type | 3 | Include in activity |
| smb:target_info_value | DESKTOP-AFPVEQ2 | Include in activity |
| smb:request | End | Determine PDU boundary |
| smb:request | Start | Determine PDU boundary |
| smb:version | 2 | Include in activity |
| smb:query_type | 1 (Request) | Determine request or response |
| smb:command | 1 (Session Setup) | Determine activity type |
| smb:ntlm_identifier | NTLMSSP | Determine Authentication Type |
| smb:ntlm_message_type | 3 (NTLMSSP_AUTH) | Determine activity type |
| smb:ntlm_workstation | IE11WIN7 | Include in activity |
| smb:request | End | Determine PDU boundary |
| smb:request | Start | Determine PDU boundary |
| smb:version | 2 | Include in activity |
| smb:query_type | 2 (Response) | Determine request or response |
| smb:nt_status | 3221225506 (0xc0000022 - NTSTATUS_ACCESS_DENIED) | Include in activity |
| smb:command | 1 (Session Setup) | Determine activity type |
| smb:request | End | Determine PDU boundary |

Figure 2C:
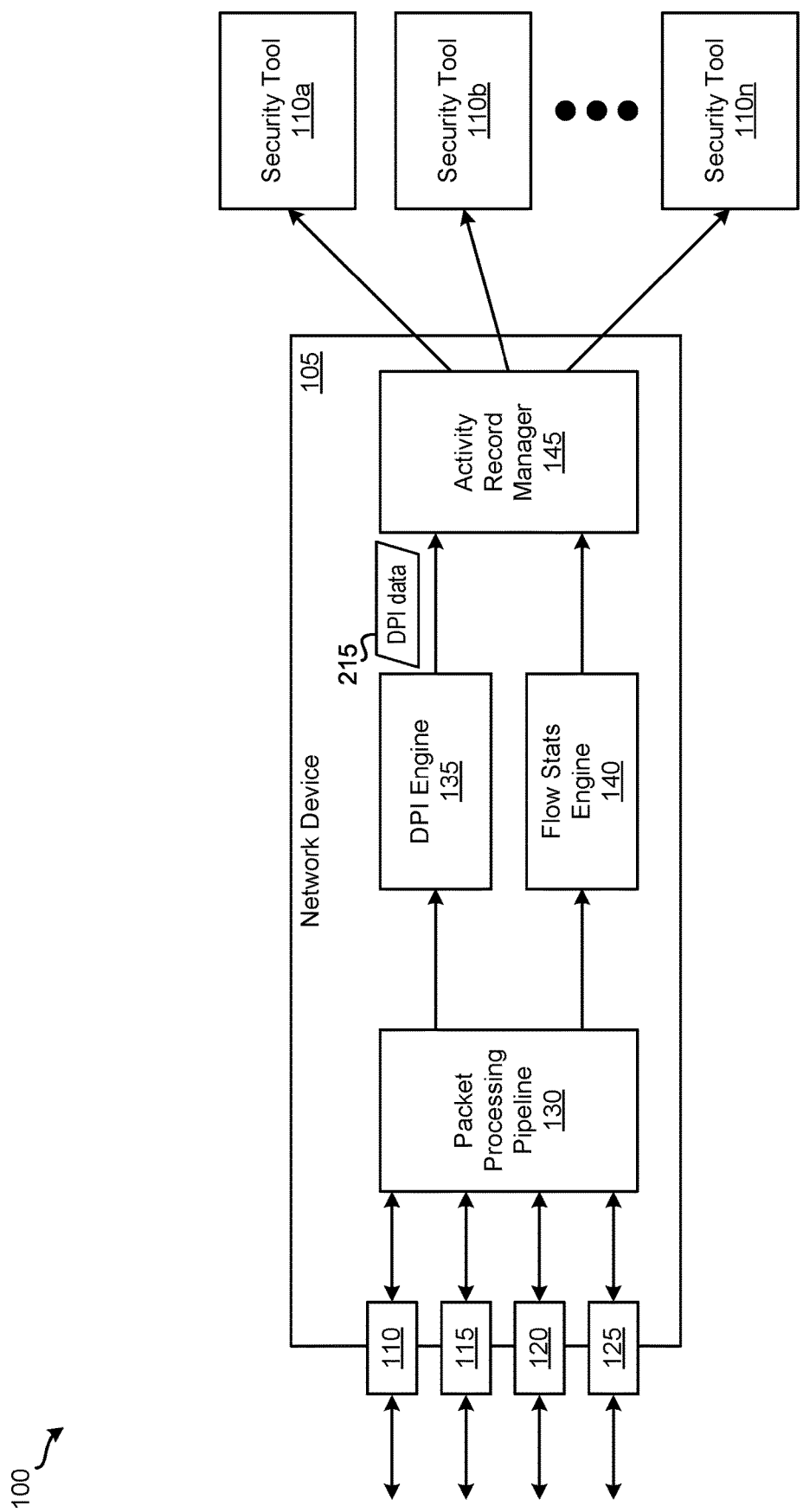

After generating the DPI records, DPI engine 135 sends the DPI records to activity record manager 145. FIG. 2C illustrates DPI engine 135 sending DPI data 215 to activity record manager 145. In this example, DPI data 215 includes the DPI records depicted in Table 2.

Figure 2D:
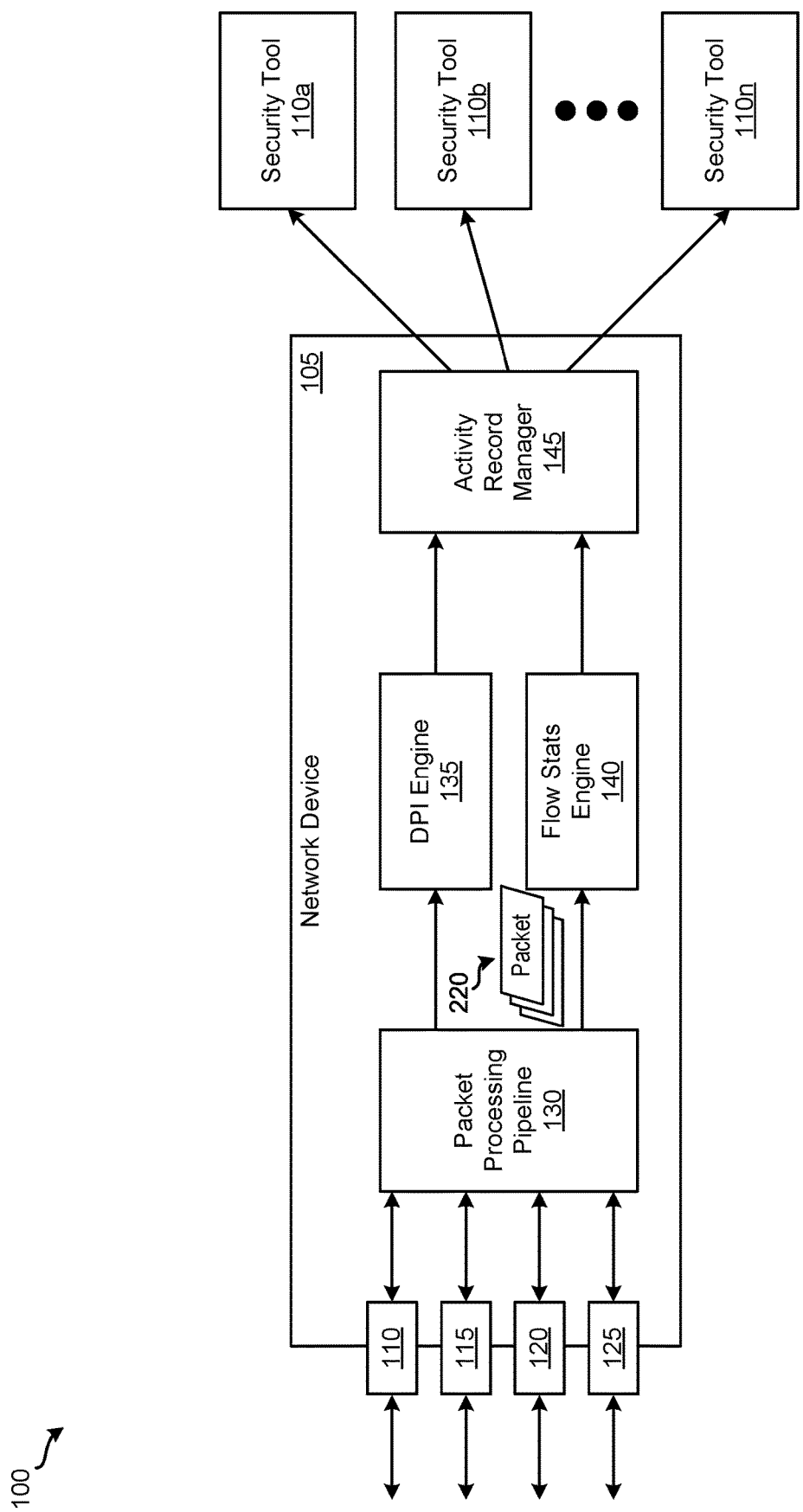

As mentioned above, packet processing pipeline 130 sends copies of packets 205 to DPI engine 135 and copies of packets 205 to flow stats engine 140 for this example. FIG. 2D illustrates packet processing pipeline 130 sending packets 220 to flow stats engine 140. Packets are copies of packets 205 in this example. For each of the packets 220, flow stats engine performs a set of flow stats operations on the packet to extract flow stats data from the packet. As described above, examples of flow stats data may include the source IP address of a packet, the destination IP address of the packet, the source port of the packet, the destination port of the packet, the transport protocol used for the packet, the size of the packet, etc. In this example, flow stats engine 140 accumulates flow stats data for flows as it extracts flow stats data from packets. Flow stats engine 140 continues to extract flow stats from packets and update flow stats data for the respective flows. At defined intervals, flow stats engine 140 generates flow stats records for each of the flows, sends the flow stats records to activity record manager 145, and clears (e.g., deletes) the flow stats data for the flow. The following Table 3 illustrates flow stats records generated from packets 220:

TABLE 3

| No. | IP Protocol | Source IP | Source Port | Destination IP | Destination Port | Packets | Bytes | Flow Created | Flow Terminated |
|---|---|---|---|---|---|---|---|---|---|
| 1 | 6 (TCP) | 192.168.198.203 | 49847 | 192.168.198.204 | 139 | 8 | 1209 | Y | Y |
| 2 | 6 (TCP) | 192.168.198.204 | 139 | 192.168.198.203 | 49847 | 8 | 1790 | Y | Y |

Figure 2E:
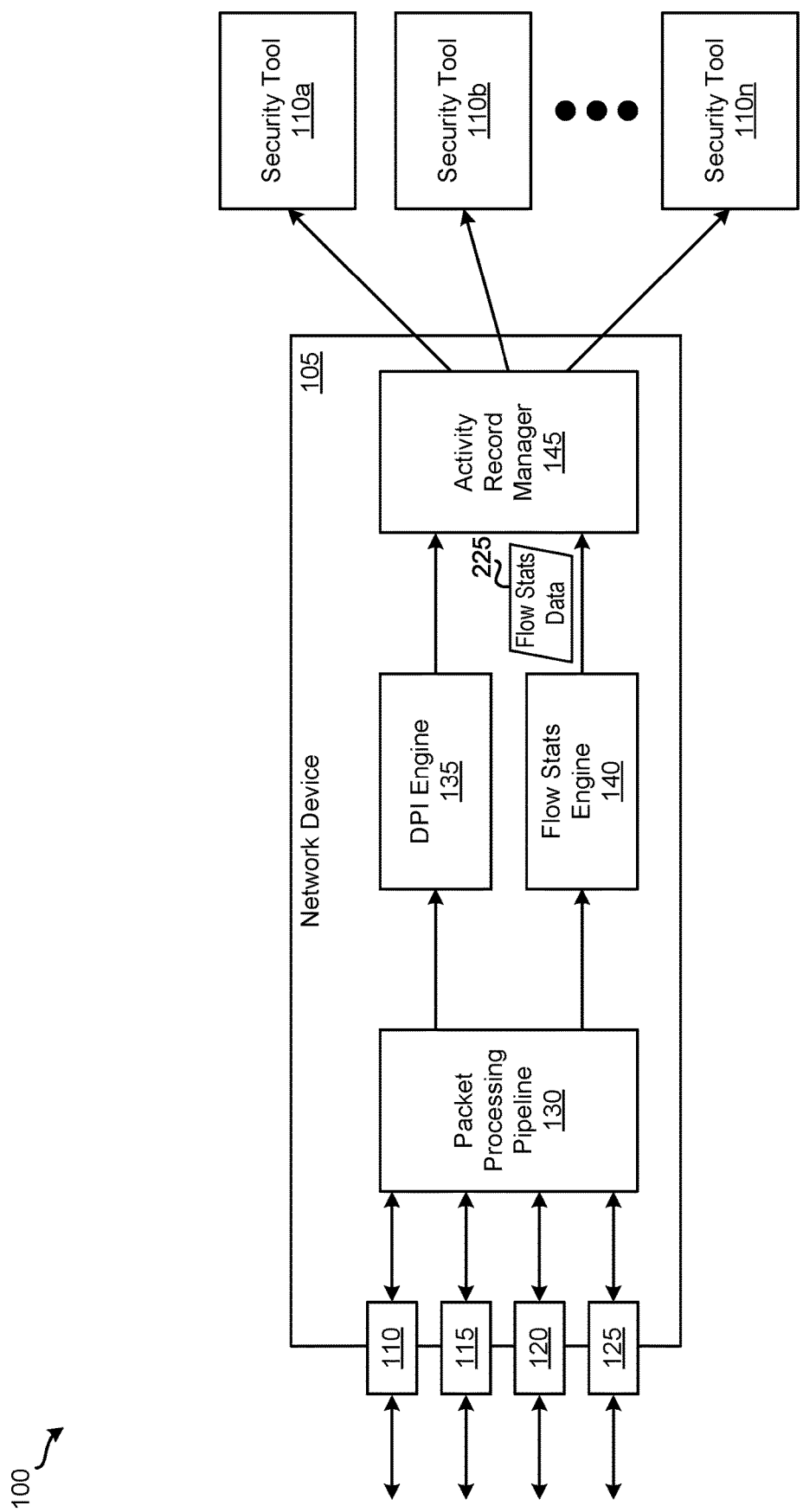

FIG. 2E illustrates flow stats engine 140 sending flow stats data 225 to activity record manager 145. Here, flow stats data 225 includes the flow stats records shown in Table 3.

After flow stats data 225 from flow stats engine 140, activity record manager 145 generates a bidirectional flow record that includes the flow stats data illustrated in Table 3 using the hashing technique described above. When activity record manager 145 receives DPI data from DPI engine 135, activity record manager 145 generates activity records based on DPI data 215 and flow stats data 225 (e.g., the bidirectional flow record). In this example, activity record manager 145 generates two activity records based on that data. The following Table 4 shows a first activity record generated based on based on DPI data 215 and flow stats data 225:

TABLE 4

| Activity Field | Value | Source of data |
| --- | --- | --- |
| activity.id | 0x"f0d8395c171949ec824ee5d9acdc7181" | N/A, generated field |
| activity.mpid | 123 | N/A, generated field |
| activity.start | 2021-04-16T04:09:38.0827 | Either |
| activity.end | 2021-04-16T04:09:38.1234 | Flow stats |
| activity.source.packets | 5 | Flow stats |
| activity.source.bytes | 517 | Flow stats |
| activity.destination.packets | 5 | Flow stats |
| activity.destination.bytes | 928 | Flow stats |
| activity.ip.source | 192.168.198.203 | Either |
| activity.ip.destination | 192.168.198.204 | Either |
| activity.ip.protocol | 6 (TCP) | Either |
| activity.tcp.source.port | 49847 | Either |
| activity.tcp.destination.port | 139 | Either |
| activity.classification | ETH, IPv4, TCP, SMB | DPI |
| activity.smb.negotiate.client.supported_dialects | 2.0.2, 2.1 | DPI |
| activity.smb.negotiate.server.selected_dialect | 2.1 | Dpi |
| activity.smb.version | 1 (SMBVERSION_2PLUS) | DPI |

The activity record in Table 4 captures the SMB negotiation information for the connection. The following Table 5 depicts a second activity record generated based on based on DPI data and flow stats data 225:

stats engine 140. As explained above, in some embodiments, for packets in a flow that packet processing pipeline 130 is processing, packet processing pipeline 130 may send copies of a defined number of packets in a flow to DPI engine 135 and send copies of packets in the entire flow to flow stats engine 140. For instance, in some such embodiments where packet processing pipeline 130 sends copies of a defined

TABLE 5

| Activity Field | Value | Source of data |
| --- | --- | --- |
| activity.id | 0x"4f2dba0f19aa49ac8f0668e60139ff65" | N/A, generated field |
| activity.mpid | 123 | N/A, generated field |
| activity.start | 2021-04-16T04:09:38.1234 | Either |
| activity.end | 2021-04-16T04:09:38.1255 | Flow stats |
| activity.source.packets | 4 | Flow stats |
| activity.source.bytes | 426 | Flow stats |
| activity.destination.packets | 3 | Flow stats |
| activity.destination.bytes | 430 | Flow stats |
| activity.ip.source | 192.168.198.203 | Either |
| activity.ip.destination | 192.168.198.204 | Either |
| activity.ip.protocol | 6 (TCP) | Either |
| activity.tcp.source.port | 49847 | Either |
| activity.tcp.destination.port | 139 | Either |
| activity.classification | ETH, IPv4, TCP, SMB | DPI |
| activity.smb.version | 1 (SMBVERSION_2PLUS) | DPI |
| activity.smb.authentication.status | 3221225506 (0xc0000022 - NTSTATUS_ACCESS_DENIED) | DPI |
| activity.smb.authentication.ntlm.username | (empty) | DPI |
| activity.smb.authentication.ntlm.workstation | IE11WIN7 | DPI |
| activity.smb.authentication.client.native_os | (empty) | DPI |
| activity.smb.authentication.client.native_lanman | (empty) | DPI |
| activity.smb.authentication.server.native_os | (empty) | DPI |
| activity.smb.authentication.server.native_lanman | (empty) | DPI |
| activity.smb.authentication.ntlm.server.netbios.host_name | DESKTOP-AFPVEQ2 | DPI |
| activity.smb.authentication.ntlm.server.netbios.domain_name | DESKTOP-AFPVEQ2 | DPI |
| activity.smb.authentication.ntlm.server.dns.host_name | DESKTOP-AFPVEQ2 | DPI |
| activity.smb.authentication.ntlm.server.dns.domain_name | DESKTOP-AFPVEQ2 | DPI |

Figure 2F:
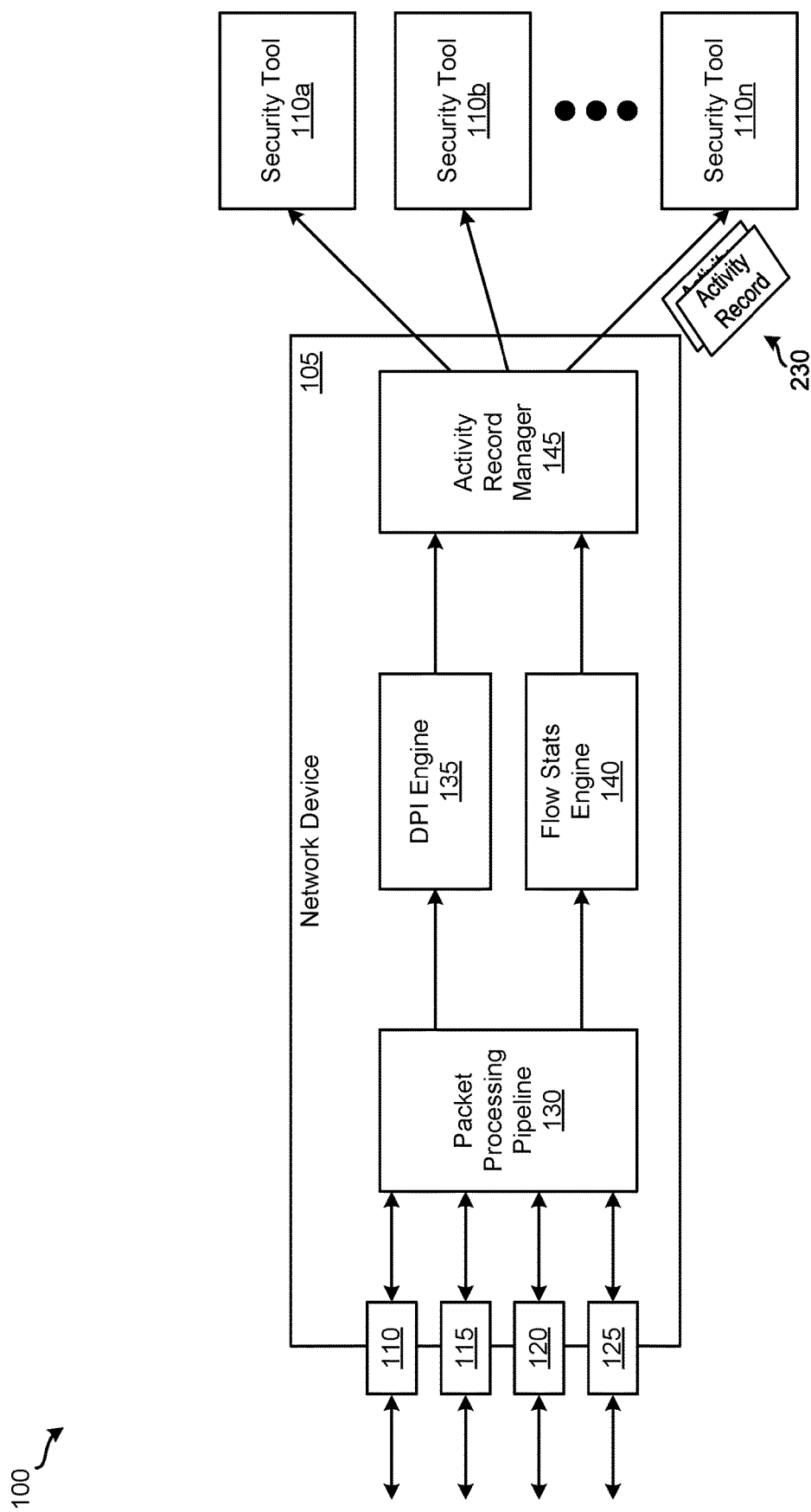

The activity record in Table 5 captures an authentication failure. After generating the two activity records, activity record manager 145 sends them to a security tool. FIG. 2F illustrates activity record manager 145 sending activity records 230 to security tool 110n. Once security tool 110n receives activity records 230, security tool 110n can further process them (e.g., perform security detection operations on them, perform security analytics on them, etc.).

The example packet flow described above by reference to FIGS. 2A-2F and Tables 1-5 illustrates a scenario in which the number of packets in the flow is short enough that the entire flow is processed by DPI engine 135 as well as flow number of packets at the beginning of a flow and the number of packets in the flow is greater than the defined number of packets, the DPI analysis will terminate after the copies of the defined number of packets at the beginning of the flow are processed while flow stats analysis is performed on the entire flow.

Figure 3:
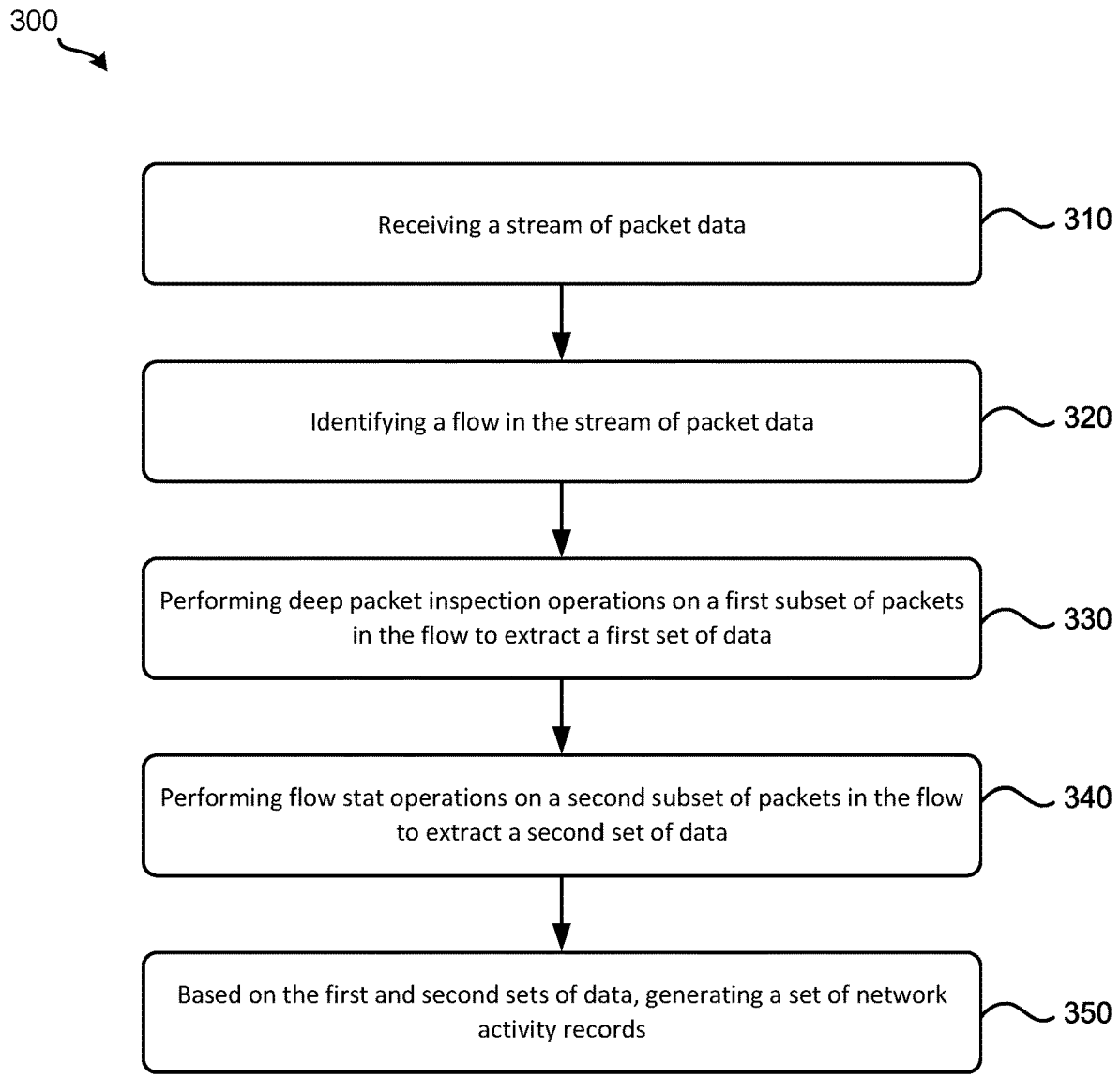
FIG. 3 illustrates a process for generating hybrid network activity records according to some embodiments.

FIG. 3 illustrates a process 300 for generating hybrid network activity records according to some embodiments. In some embodiments, network device 105 performs process 300. Process 300 starts by receiving, at block 310, a stream of packet data. Referring to FIG. 2A as an example, network device 105 can receive packets 205. Next, process 300 identifies, at block 320, a flow in the stream of packet data. Referring to FIG. 2D as an example, when flow stats engine 140 receives the first packet from packets 220, flow stats engine 140 determines that it belongs to a new flow.

Then, process 300 performs, at block 330, deep packet inspection operations on a first subset of packets in the flow to extract a first set of data. Referring to FIG. 2B as an example, DPI engine 135 performs a set of DPI operations on each of the packets 210 by parsing through the SMB application protocol messages included in the packet, extracting values of defined attributes in the protocol messages, generating a DPI record that includes the extracted attribute values.

At block 340, process 300 performs flow stat operations on a second subset of packets in the flow to extract a second set of data. Referring to FIG. 2D as an example, flow stats engine performs a set of flow stats operations on each of the packets 220 to extract flow stats data from the packets and accumulates the flow stats data that it collects from the packets. Flow stats engine 140 generates the flow stats records illustrated in Table 3.

Finally, based on the first and second sets of data, process 300 generates, at block 350, a set of network activity records. Referring to FIGS. 2C and 2E, activity record manager generates network activity records based on DPI data 215 received from DPI engine 135 and flow stats data 225 received from flow stats engine 140. The network activity records are shown in Tables 4 and 5.

Figure 4:
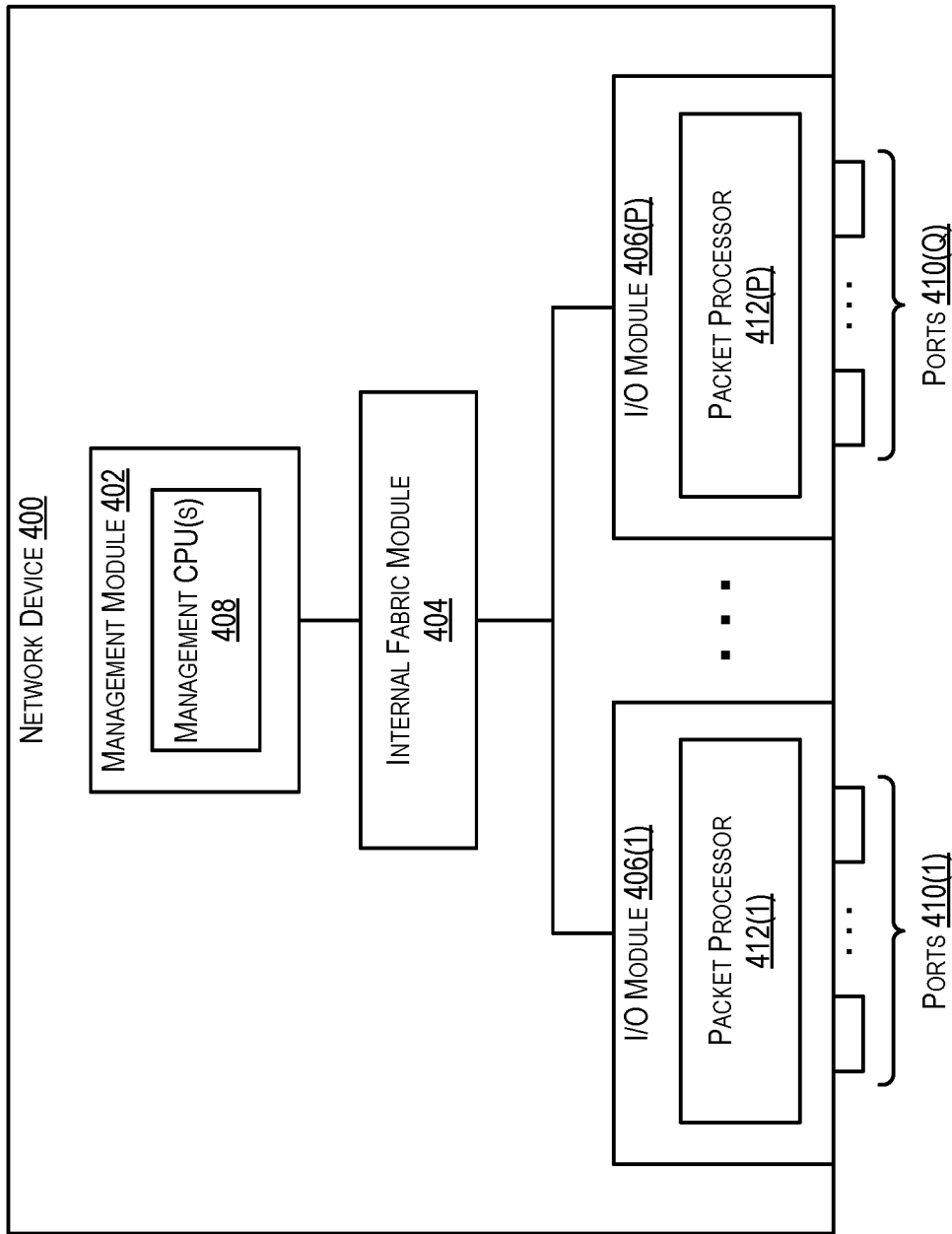
FIG. 4 illustrates an example network device according to some embodiments.

FIG. 4 illustrates the architecture of an example network device (e.g., a network switch or router) 400 that may implement the techniques of the present disclosure according to certain embodiments. For example, network device 400 may correspond to network device 105 shown in FIG. 1.

Network device 400 includes a management module 402, an internal fabric module 404, and a number of I/O modules 406(1)-(P). Management module 402 includes one or more management CPUs 408 for managing/controlling the operation of the device. Each management CPU 408 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 404 and I/O modules 406(1)-(P) collectively represent the data, or forwarding, plane of network device 400. Internal fabric module 404 is configured to interconnect the various other modules of network device 400. Each I/O module 406 includes one or more input/output ports 410(1)-(Q) that are used by network device 400 to send and receive network packets. Each I/O module 406 can also include a packet processor 412, which is a hardware processing component that can make wire speed decisions on how to handle incoming or outgoing network packets.

It should be appreciated that network device 400 is illustrative and other configurations having more or fewer components than network device 400 are possible.

The following are some example embodiments of the present disclosure. In some embodiments, a method executable by a network device, comprises receiving a stream of packet data; identifying a flow in the stream of packet data; performing deep packet inspection operations on a first subset of packets in the flow to extract a first set of data; performing flow stat operations on a second subset of packets in the flow to extract a second set of data; and based on the first and second sets of data, generating a set of network activity records.

In some embodiments, the present disclosure further comprises sending the set of network activity records to a security tool.

In some embodiments, the present disclosure further comprises generating a record based on the second set of data.

In some embodiments, the stream of packet data is a first stream of packet data. The present disclosure further comprises receiving a second stream of packet data; identifies a second flow in the second stream of packet data; performing flow stat operations on a third subset of packets in the second flow to extract a third set of data; determining that the first flow and the second flow are the same flow; and updating the record based on the third set of data.

In some embodiments, the record is a first record. The present disclosure further comprises generating a second record based on the first set of data, wherein generating the set of network activity records comprises combining the first and second records into a single record.

In some embodiments, the first subset of packets in the flow comprises a defined number of packets belonging to the beginning of the flow.

In some embodiments, the first set of data comprises a set of values for a set of attributes in a set of application protocol messages included in the first subset of packets In some embodiments, a non-transitory machine-readable medium stores a program executable by at least one processing unit of a network device. The program comprising sets of instructions for receiving a stream of packet data in a flow of traffic in a network; performing deep packet inspection operations on a first subset of packets in the flow to extract a first set of data from an application layer of the first subset of the packets in the flow; performing flow stat operations on a second subset of packets in the flow to extract a second set of data from a transport layer of the second subset of the packets in the flow; and based on the first and second sets of data, generating a set of network activity records.

In some embodiments, a network device comprises a set of processing units and a non-transitory machine-readable medium storing instructions. The instructions cause at least one processing unit to receive a stream of packet data in a flow of traffic in a network; perform a first set of operations on a first subset of packets in the flow to extract a first set of data from an application layer of the first subset of the packets in the flow; perform a second set of operations on a second subset of packets in the flow to extract a second set of data from a transport layer of the second subset of the packets in the flow; and based on the first and second sets of data, generate a set of network activity records.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method executable by a network device, the method comprising:
receiving one or more streams of packets;
processing the one or more streams of packets;
based on the processing, forwarding each packet in the one or more streams of packets to a specified destination in a network; and
concurrently with the receiving, the processing, or the forwarding:
generating copies of the one or more streams of packets;
examining packet headers in the copies to identify a forward flow and a reverse flow, wherein each packet in the forward flow comprises a first source Internet Protocol (IP) address and a first destination IP address, and wherein each packet in the reverse flow comprises a second source IP address corresponding to the first destination IP address and a second destination IP address corresponding to the first source IP address;
performing deep packet inspection (DPI) operations on a first subset of packets in the forward and reverse flows to generate a set of DPI records, the DPI operations including, for each packet in the first subset of packets;
identifying one or more application protocol messages included in the packet, the one or more application protocol messages pertaining to an application protocol to which the packet belongs; and
for each application protocol message:
extracting one or more attribute values from the application protocol message that pertain to attributes defined in the application protocol; and
generating a DPI record that includes the extracted one or more attribute values;
performing flow stat operations on a second subset of packets in the forward and reverse flows to generate a first flow stats record for the forward flow and a second flow stats record for the reverse flow;
generating a set of network activity records by:
generating a bidirectional flow stats record for the forward and reverse flows that includes the first flow stats record and the second flow stats record; and
for each DPI record in the set of DPI records, generating a network activity record based on the DPI record and the bidirectional flow stats record; and
sending the set of network activity records to one or more destinations different from the specified destination for each packet.

2. The method of claim 1 further comprising:
receiving a another stream of packets;
identifying another flow in said another stream of packets;
performing flow stat operations on a third subset of packets in said another flow;
determining that said another flow is a same flow as the forward flow or the reverse flow; and
in response to the determining, updating the first flow stats record or the second flow stats record using data extracted from the third subset of packets in said another flow.

3. The method of claim 1, wherein the first subset of packets corresponds to a defined number of packets in the forward or reverse flows, and wherein the defined number of packets is less than a total number of packets in the forward or reverse flows.

4. The method of claim 1, wherein the second subset of packets includes all packets in the forward and reverse flows.

5. The method of claim 1, wherein the one or more application protocol messages include a first application protocol message corresponding to an application protocol request and a second application protocol message corresponding to an application protocol response sent in reply to the application protocol request.

6. The method of claim 1, wherein the set of network activity records are generated upon determining that the forward or reverse flows have completed.

7. The method of claim 6, wherein determining that the forward or reverse flows have completed comprises:
initiating a timer upon generating the first flow stats record or second flow stats record;
restarting the timer upon receiving an additional stream of packets that includes the forward flow or the reverse flow; and
determining that the forward or reverse flows have completed upon expiration of the timer.

8. A non-transitory machine-readable medium storing a program executable by at least one processing unit of a network device, the program comprising sets of instructions for:
receiving one or more streams of packets in a network;
processing the one or more streams of packets;
based on the processing, forwarding each packet in the one or more streams of packets to a specified destination in the network; and
concurrently with the receiving, the processing, or the forwarding:
generating copies of the one or more streams of packets;
examining packet headers in the one or more streams of packets to identify a forward flow and a reverse flow, wherein each packet in the forward flow comprises a first source Internet Protocol (IP) address and a first destination IP address, and wherein each packet in the reverse flow comprises a second source IP address corresponding to the first destination IP address and a second destination IP address corresponding to the first source IP address;
performing deep packet inspection (DPI) operations on a first subset of packets in the forward and reverse flows to generate a set of DPI records, the DPI operations including, for each packet in the first subset of packets;
identifying one or more application protocol messages included in the packet, the one or more application protocol messages pertaining to an application protocol to which the packet belongs; and
for each application protocol message:
extracting one or more attribute values from the application protocol message that pertain to attributes defined in the application protocol; and
generating a DPI record that includes the extracted one or more attribute values;
performing flow stat operations on a second subset of packets in the forward and reverse flows to generate a first flow stats record for the forward flow and a second flow stats record for the reverse flow;

generating a set of network activity records by:
    generating a bidirectional flow stats record for the forward and reverse flows that includes the first flow stats record and the second flow stats record; and
    for each DPI record in the set of DPI records, generating a network activity record based on the DPI record and the bidirectional flow stats record; and
sending the set of network activity records to one or more destinations different from the specified destination for each packet.

9. The non-transitory machine-readable medium of claim 8 wherein the program further comprises sets of instructions for:
    receiving another stream of packets;
    identifying another flow in said another stream of packets;
    performing flow stat operations on a third subset of packets in said another flow;
    determining that said another flow is a same flow as the forward flow or the reverse flow; and
    in response to the determining, updating the first flow stats record or the second flow stats record using data extracted from the third subset of packets in said another flow.

10. The non-transitory machine-readable medium of claim 8, wherein the first subset of packets corresponds to a defined number of packets in the forward or reverse flows, and wherein the defined number of packets is less than a total number of packets in the forward or reverse flows.

11. The non-transitory machine-readable medium of claim 8, wherein the second subset of packets includes all packets in the forward and reverse flows.

12. The non-transitory machine-readable medium of claim 8, wherein the one or more application protocol messages include a first application protocol message corresponding to an application protocol request and a second application protocol message corresponding to an application protocol response sent in reply to the application protocol request.

13. The non-transitory machine-readable medium of claim 8, wherein the set of network activity records are generated upon determining that the forward or reverse flows have completed.

14. The non-transitory machine-readable medium of claim 13, wherein determining that the forward or reverse flows have completed comprises:
    initiating a timer upon generating the first flow stats record or second flow stats record;
    restarting the timer upon receiving an additional stream of packets that includes the forward flow or the reverse flow; and
    determining that the forward or reverse flows have completed upon expiration of the timer.

15. A network device comprising:
a set of processing units; and
a non-transitory machine-readable medium storing instructions that when executed by at least one processing unit in the set of processing units cause the at least one processing unit to:
    receive one or more streams of packets in a network;
    process the one or more streams of packets;
    based on the processing, forward each packet in the one or more streams of packets to a specified destination in the network; and
    concurrently with the receiving, the processing, or the forwarding:
        generate copies of the one or more streams of packets;
        examine packet headers in the copies to identify a forward flow and a reverse flow, wherein each packet in the forward flow comprises a first source Internet Protocol (IP) address and a first destination IP address, and wherein each packet in the reverse flow comprises a second source IP address corresponding to the first destination IP address and a second destination IP address corresponding to the first source IP address;
        perform a first set of operations on a first subset of packets in the forward and reverse flows to generate a set of deep packet inspection (DPI) records, the first set of operations including, for each packet in the first subset of packets:
            identifying one or more application protocol messages included in the packet, the one or more application protocol messages pertaining to an application protocol to which the packet belongs; and
            for each application protocol message:
                extracting one or more attribute values from the application protocol message that pertain to attributes defined in the application protocol; and
                generating a DPI record that includes the extracted one or more attribute values;
        perform a second set of operations on a second subset of packets in the forward and reverse flows to generate a first flow stats record for the forward flow and a second flow stats record for the reverse flow;
        generate a set of network activity records by:
            generating a bidirectional flow stats record for the forward and reverse flows that includes the first flow stats record and the second flow stats record; and
            for each DPI record in the set of DPI records, generating a network activity record based on the DPI record and the bidirectional flow stats record; and
        send the set of network activity records to one or more destinations different from the specified destination for each packet.

16. The network device of claim 15 wherein the instructions further cause the at least one processing unit to:
    receive another stream of packet data packets;
    identify another flow in said another stream of packets;
    perform a third set of operations on a third subset of packets in said another flow;
    determine that said another flow is a same flow as the forward flow or the reverse flow; and
    in response to the determining, update the first flow stats record or the second flow stats record using data extracted from the third subset of packets in said another flow.

17. The network device of claim 15, wherein the second subset of packets includes all packets in the forward and reverse flows.

18. The network device of claim 15, wherein the one or more application protocol messages include a first application protocol message corresponding to an application protocol request and a second application protocol message corresponding to an application protocol response sent in reply to the application protocol request.

19. The network device of claim 15, wherein the set of network activity records are generated upon determining that the forward or reverse flows have completed.

20. The network device of claim 19, wherein determining that the forward or reverse flows have completed comprises:
   initiating a timer upon generating the first flow stats record or second flow stats record;
   restarting the timer upon receiving an additional stream of packets that includes the forward flow or the reverse flow; and
   determining that the forward or reverse flows have completed upon expiration of the timer.

* * * * *